United States Patent
Nakamura et al.

(10) Patent No.: US 8,311,052 B2
(45) Date of Patent: Nov. 13, 2012

(54) CONTROL OF PACKET BUFFER USING TOKEN BUCKETS WITH DIFFERENT TOKEN BUCKET SIZES

(75) Inventors: Hajime Nakamura, Saitama (JP); Norihiro Fukumoto, Saitama (JP); Takeshi Kitahara, Saitama (JP)

(73) Assignee: KDDI Corporation, Tokyo (JP)

( * ) Notice: Subject to any disclaimer, the term of this patent is extended or adjusted under 35 U.S.C. 154(b) by 207 days.

(21) Appl. No.: 12/816,663

(22) Filed: Jun. 16, 2010

(65) Prior Publication Data

US 2010/0246596 A1    Sep. 30, 2010

Related U.S. Application Data

(63) Continuation-in-part of application No. PCT/JP2008/072830, filed on Dec. 16, 2008.

(30) Foreign Application Priority Data

Dec. 17, 2007  (JP) .................................. 2007-325326

(51) Int. Cl.
*H04L 12/28* (2006.01)
(52) U.S. Cl. ...................... 370/412; 370/235.1; 709/235
(58) Field of Classification Search .................. 370/229, 370/230.1, 235, 235.1, 252, 395.1, 395.21, 370/412, 450, 465, 464; 709/227–235
See application file for complete search history.

(56) References Cited

U.S. PATENT DOCUMENTS

| | | | |
|---|---|---|---|
| 6,349,088 B1 | 2/2002 | Ginzboorg et al. | |
| 6,522,628 B1 * | 2/2003 | Patel et al. | 370/230.1 |
| 8,032,653 B1 * | 10/2011 | Liu et al. | 709/235 |
| 8,045,456 B1 * | 10/2011 | Kondapalli | 370/229 |
| 2002/0114334 A1 * | 8/2002 | Yang | 370/395.1 |
| 2006/0146710 A1 * | 7/2006 | Roy | 370/235 |
| 2006/0164988 A1 * | 7/2006 | Mishra et al. | 370/235 |
| 2007/0104103 A1 * | 5/2007 | Howe et al. | 370/230.1 |
| 2009/0285095 A1 * | 11/2009 | Baden et al. | 370/235 |

FOREIGN PATENT DOCUMENTS

| | | |
|---|---|---|
| JP | 2000-501576 A | 2/2000 |
| JP | 2007-049591 A | 2/2007 |
| JP | 2007-097045 A | 4/2007 |
| JP | 2007-189592 A | 7/2007 |
| JP | 2007-221529 A | 8/2007 |
| JP | 2007-325224 A | 12/2007 |

OTHER PUBLICATIONS

International Search Report of PCT/JP2008/072830, Mailing Date of Mar. 31, 2009.

* cited by examiner

*Primary Examiner* — Hassan Phillips
*Assistant Examiner* — Ajay Cattungal
(74) *Attorney, Agent, or Firm* — Westerman, Hattori, Daniels & Adrian, LLP

(57) ABSTRACT

Control of readout of packets from a packet buffer is disclosed in which equal numbers of tokens are removed and used from token buckets having different bucket sizes; tokens are generated at token rates for the token buckets, wherein each token rate is preset such that the larger the token bucket size, the lower the token rate, and the generated tokens are added to the token buckets; a used-token count is measured for each token bucket, and a stored-token count is measured for each token bucket, with the stored-token count given a negative value if each token bucket is empty; and a number of data packets are read out of the packet buffer, which depends on the measured value of the used-token count for each token buffer.

9 Claims, 11 Drawing Sheets

US 8,311,052 B2

CONTROL OF PACKET BUFFER USING TOKEN BUCKETS WITH DIFFERENT TOKEN BUCKET SIZES

CROSS-REFERENCE TO RELATED APPLICATIONS

The present application is based on and claims the benefit of priority from Japanese Patent Application No. 2007-325326 filed Dec. 17, 2007, and International Application No. PCT/JP2008/072830 filed Dec. 16, 2008, the contents of which are incorporated herein by reference in their entirety.

This application is a continuation-in-part application of International Application No. PCT/JP2008/072830 filed Dec. 16, 2008, now pending, which was published in Japanese under PCT Article 21(2).

BACKGROUND OF THE INVENTION

1. Field of the Invention

The invention relates generally to packet buffer units having token buckets and control of such buffer units.

2. Description of the Related Art

Packet readout control for a packet buffer includes a "token bucket" algorithm. This token bucket algorithm is a technique for use in a packet buffer which has stored data packets therein, for controlling readout of some of the data packets out of the packet buffer. In this regard, a "token" represents authorization, permission or privilege of readout of a unit of data. A "token bucket" refers to a buffer for temporary storage of tokens which has been generated and added to the token bucket at a predetermined rate. When a certain number of tokens have been removed and used (or spent) from the token bucket, data packets are read out of the packet buffer a number of data packets which depends on the number of tokens that were removed and used from the token bucket.

FIG. 1 illustrates the configuration of a conventional exemplary buffer unit 1.

As illustrated in FIG. 1, the buffer unit 1 includes a packet buffer 10; a packet reader 11; a token bucket 12; a token generator 13; and a token controller 14. These components can be implemented in software, that is, by executing a predetermined program by a computer mounted in the buffer unit 1 (e.g., a communication device having a buffer section).

The packet buffer 10 stores data packets temporarily. The packet reader 11 reads out of the packet buffer 10 a number of data packets which depends on the number of tokens that were removed and used (or spent) from the token bucket 12, and the packet reader 11 outputs the read data packets. The token bucket 12 stores tokens therein temporarily, with a buffer size which represents the maximum number of tokens that can be stored (hereinafter, referred to as "token bucket size"). The token generator 13 generates new tokens at a predetermined rate (referred to the number of tokens to be newly generated per unit time, and hereinafter referred to as "token rate (or token fill rate)"), and adds the generated tokens to the token bucket 12 for filling. The token controller 14 controls the number of tokens to be removed and used from the token bucket 12.

For packet readout control for a packet buffer using a token bucket, the selection of the token bucket size of the token bucket 12 and the selection of the token rate at which tokens are generated and added by the token generator 13 are important.

Traditionally, it is typical to prepare token buckets on a per-traffic-type basis, for controlling communication network traffic. A technique is known of controlling packet readout for a packet buffer, in combination with a plurality of token buckets (see Japanese Patent Application Publication No. 2007-049591, for example). This technique allows the token buckets to be assigned to a plurality of traffic types, on a one-on-one correspondence.

Another technique is also known of dynamically changing the token bucket size and the token rate of a token bucket, depending on the time-varying congestion level of a network (see Japanese Patent Application Publication Nos. 2007-189592, 2007-221529, and 2007-097045, for example). This technique, which uses single token buckets for the respective traffic types, allows the values of parameters including the token bucket size and the token size of each token bucket to be dynamically modified, with the capability of adaptive control of the parameter values depending on such as the congestion level of a network.

The readout control of packets from a packet buffer using a token bucket would regulate the long-term average traffic volume, while allowing for burst traffic to be transferred centrally within a short term. The maximum allowed burst traffic volume depends on the token bucket size, while the long-term average traffic volume is limited by the token rate.

In this regard, it is also important to control traffic on a per-traffic-type basis, using tradeoff between the burst traffic volume and the average traffic volume. More specifically, an approach of increasing the average traffic volume while limiting the maximum allowed burst traffic volume, or a contrary approach of increasing the maximum allowed burst traffic volume while limiting the average traffic volume, is selected in view of potential effects on a network capacity, on a per-traffic-type basis.

BRIEF SUMMARY OF THE INVENTION

The conventional technique described above, however, requires prior precise setting of parameters including both the token bucket size and the token rate of a token bucket, in accordance with the actual traffic characteristic. This requires observation or prediction of the actual traffic characteristic for a given period, to thereby determine which one of the burst traffic volume or the average traffic volume should be selected as a more influential factor. After selection, the token bucket size and the token rate are specified. As a result, traditionally, inadequate knowledge about the specific traffic characteristic fails to optimize the token bucket size or the token rate.

For example, in a communication network, its diversity requires fine traffic-control on a per-traffic-type basis. However, in a mixed traffic environment, it is difficult to identify the actual traffic characteristic on a per-traffic-type basis, which makes it difficult to adequately optimize the token bucket size and the token rate.

In view of the foregoing, it would be desirable to adaptively or flexibly control readout of packets from a packet buffer, without requiring prior precise setting of parameters including the token bucket size and the token rate, in accordance with the actual traffic characteristic.

In general, the invention relates to techniques of controlling a packet buffer using token buckets with different token bucket sizes and token rates.

According to some aspects of the invention, equal numbers of tokens are removed and used from token buckets having different token bucket sizes; tokens are generated at token rates for the token buckets, wherein each token rate is preset such that the larger the token bucket size of each token bucket, the lower the token rate for each token bucket, and the generated tokens are added to the token buckets; a used-token count is measured which represents a number of tokens that were used from each token bucket, and a stored-token count is measured which represents a number of tokens stored in each token bucket, with the stored-token count given a negative value if each token bucket is empty; and a number of data packets are read out of the packet buffer, which depends on the measured value of the used-token count for each token buffer.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

Figure 1:
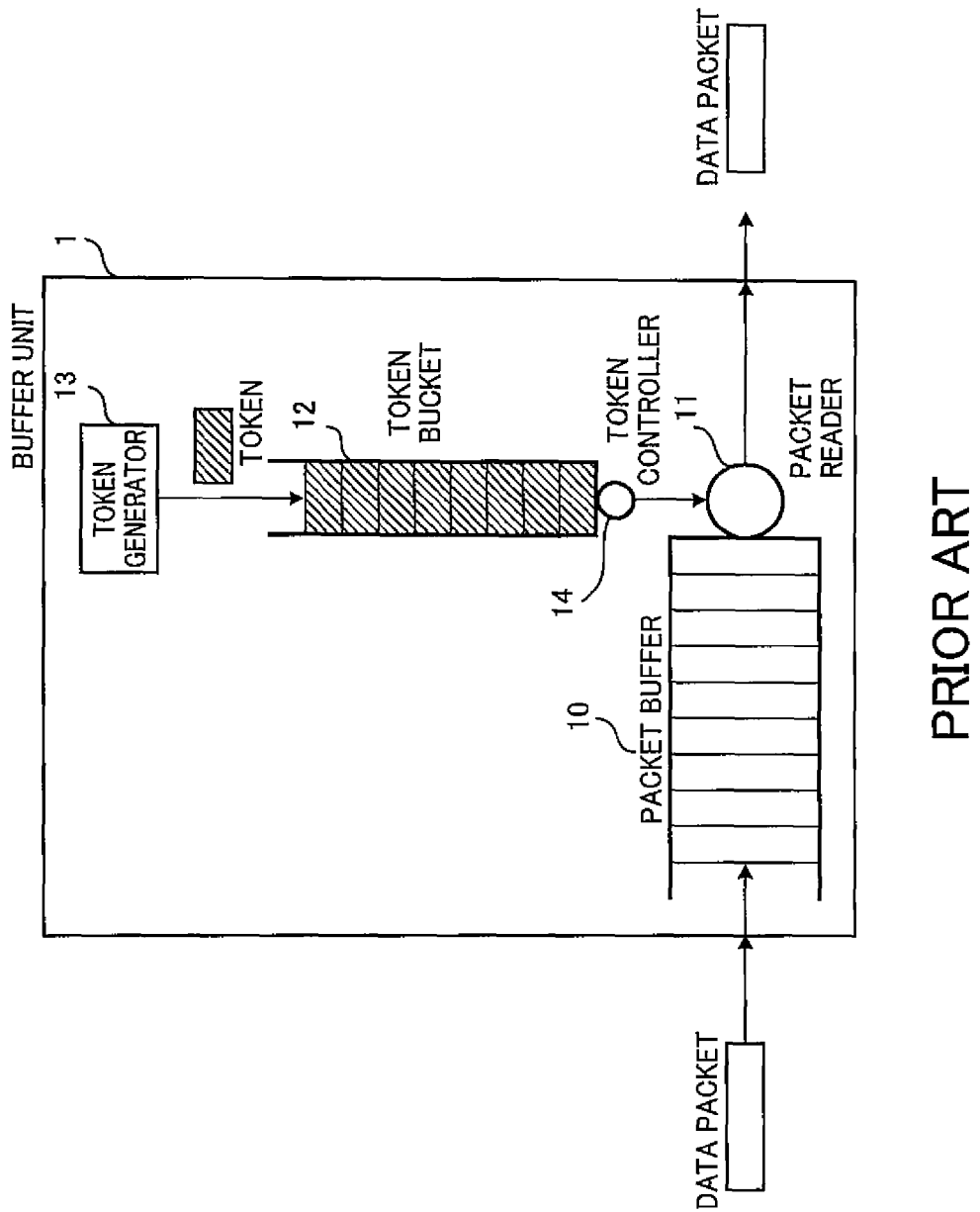
FIG. 1 is a schematic diagram illustrating a conventional exemplary buffer unit with its functions highlighted.

According to a first aspect of the invention, there is provided a buffer unit having a packet buffer for temporary storage of data packets, comprising:

a plurality of token buckets, each of which allows for temporary storage of tokens each authorizing transmission of a unit of data, wherein the token buckets have different token bucket sizes, respectively, and wherein each token bucket size represents a maximum number of tokens that can be stored in a corresponding one of the token buckets;

a plurality of token controllers associated with the respective token buckets, and configured to remove and use equal numbers of tokens from the respective token buckets;

a plurality of token generators associated with the respective token buckets, wherein each token generator is configured to generate tokens at a token rate at which tokens are to be generated per unit time for a corresponding one of the token buckets, wherein each token rate is preset such that the larger the token bucket size of the corresponding token bucket, the lower the token rate for the corresponding token bucket, and wherein each token generator is further configured to add the generated tokens to the corresponding token bucket;

a plurality of token counters associated with the respective token buckets, wherein each token counter is configured to measure a used-token count which represents a number of tokens that were used from a corresponding one of the token buckets, and measure a stored-token count which represents a number of tokens being stored in the corresponding token bucket, with the stored-token count given a negative value if the corresponding token bucket is empty; and a packet reader configured to read out of the packet buffer a number of data packets which depends on the measured value of the used-token count for each token buffer.

According to a second aspect of the invention, there is provided a method of controlling a buffer unit having a packet buffer for temporary storage of data packets, wherein the buffer unit is configured to include a plurality of token buckets, each of which allows for temporary storage of tokens each authorizing transmission of a unit of data, wherein the token buckets have different token bucket sizes, respectively, and wherein each token bucket size represents a maximum number of tokens that can be stored in a corresponding one of the token buckets, the method comprising:

removing and using equal numbers of tokens from the token buckets, respectively;

generating tokens at a token rate at which tokens are to be generated per unit time for each token bucket, wherein each token rate is preset such that the larger the token bucket size of each token bucket, the lower the token rate for each token bucket, and adding the generated tokens to the token buckets, respectively;

measuring a used-token count which represents a number of tokens that were used from each token bucket, and measuring a stored-token count which represents a number of tokens stored in each token bucket, with the stored-token count given a negative value if each token bucket is empty; and reading out of the packet buffer a number of data packets which depends on the measured value of the used-token count for each token buffer.

Illustrative Embodiments

According to the invention, the following modes are provided as illustrative embodiments of the invention.

According to a first mode of the invention, there is provided the buffer unit according to the first aspect of the invention, wherein the plurality of token controllers are configured to use tokens from the respective token buckets every unit time;

and the plurality of token generators are configured to add tokens to the respective token buckets at the respective token rates, each time the respective token controllers use tokens.

According to a second mode of the invention, there is provided the buffer unit according to the first aspect or the first mode, wherein each token counter is configured to operate, when the measured stored-token count for the corresponding token bucket has a negative value, to increase the stored-token count toward a positive value, each time tokens are added to the corresponding token bucket.

According to a third mode of the invention, there is provided the buffer unit according to any one of the first aspect, the first mode and the second mode, wherein the token buckets share a same maximum possible token use count which represents a maximum number of tokens which can be used from each token bucket at a time, and wherein the maximum possible token use count is preset depending on a maximum possible readout rate at which the packet reader can read the data packets from the packet buffer.

According to a fourth mode of the invention, there is provided the buffer unit according to the third mode, wherein the plurality of token controllers are configured to operate, when at least one of the token buckets has stored therein a number of tokens equal to or more than the maximum possible token use count, to use tokens from the respective token buckets, a same number of tokens as the maximum possible token use count, and operate, when none of the token buckets has stored therein tokens equal to or more than the maximum possible token use count, to select one of the token buckets which has stored therein a largest number of tokens among the token buckets, and to use equal numbers of tokens from the respective token buckets, wherein each of the equal numbers is set to be a same as a number of tokens which have been stored in the selected token bucket.

According to a fifth mode of the invention, there is provided the buffer unit according to any one of the first aspect and the first through fourth modes, wherein the token controllers are configured to variably determine desired values of the used-token counts, depending on the stored-token counts for the token buckets, to thereby allow the readout rate for the packet reader to change depending on the determined desired values.

According to a sixth mode of the invention, there is provided a communication device for transmitting data packets, which includes the buffer unit constructed according to any one of the first aspect and the first through fifth modes.

According to a seventh mode of the invention, there is provided a computer-readable non-transitory storage medium having stored therein a program which, when executed by a computer, effects the method according to the second aspect.

The "computer-readable non-transitory storage medium" may be realized in any one of a variety of types, including a magnetic recording medium, such as a flexible-disc, an optical recording medium, such as a CD and a CD-ROM, an optical-magnetic recording medium, such as an MO, an unremovable storage, such as a ROM, for example.

Several presently preferred embodiments of the invention will be described in more detail by reference to the drawings in which like numerals are used to indicate like elements throughout.

Figure 2:
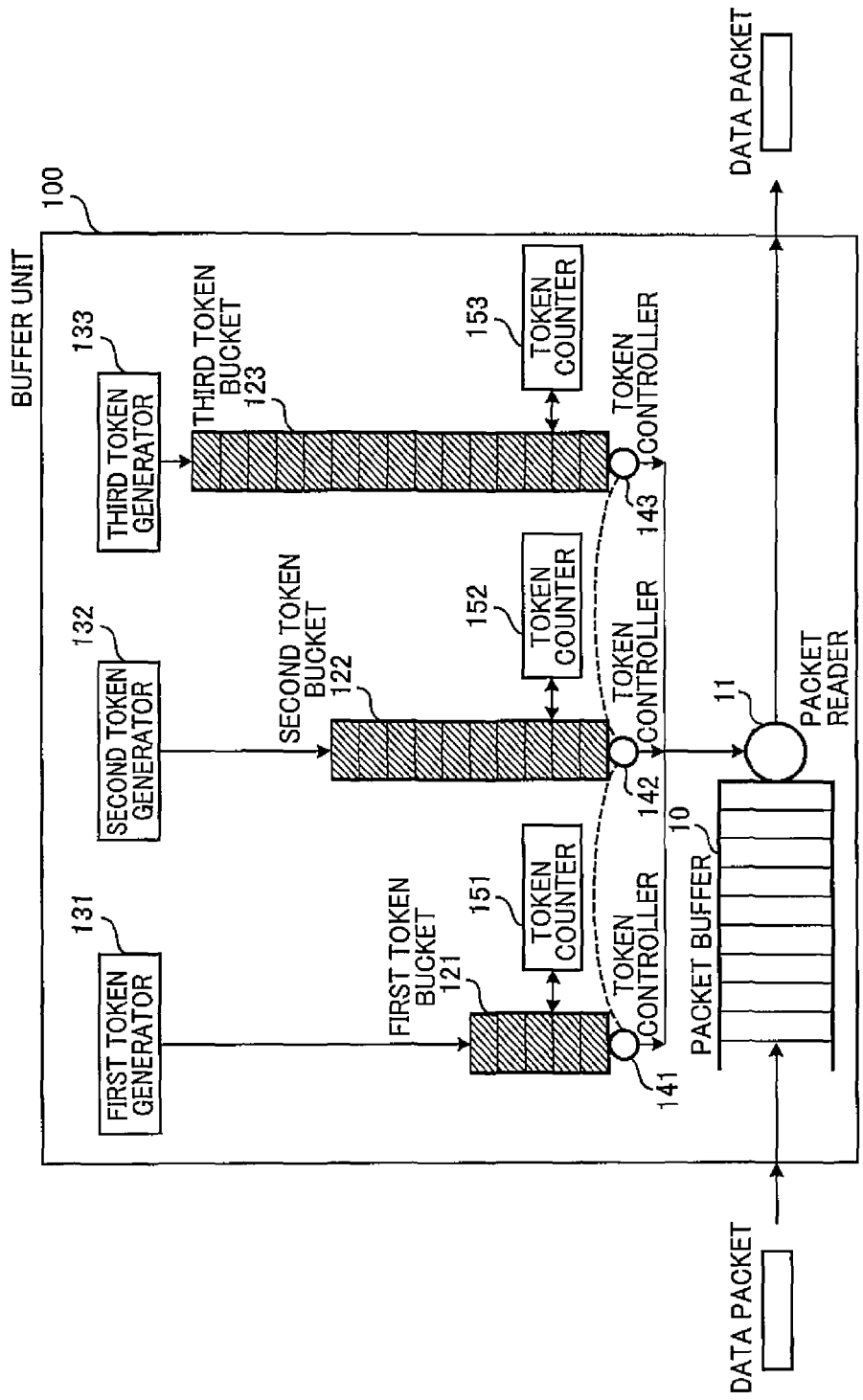
FIG. 2 is a schematic diagram illustrating a buffer unit with its functions highlighted, which is constructed according to an illustrative embodiment of the present invention.

Referring now to FIG. 2, the configuration of a buffer unit 100 according to an exemplary embodiment of the present invention is illustrated. The buffer unit 100 is for use in, but not limited to, a communication system for cellular phones.

As illustrated in FIG. 2, the buffer unit 100 is configured to include three token buckets (i.e., first, second and third token buckets) 121, 122 and 123, and token generators 131, 132 and 133 for the respective token buckets 121, 122 and 123.

As for the selection of token bucket sizes and token rates, the first token bucket 121 has the smallest token bucket size, while having the highest token rate at which the corresponding token generator 131 generates tokens. The second token bucket 122 has a medium token bucket size, while having a medium token rate at which the corresponding token generator 132 generates tokens. The third token bucket 123 has the largest token bucket size, while having the lowest token rate at which the corresponding token generator 133 generates tokens.

Thus, the token buckets 121, 122 and 123 in the present embodiment are configured, such that the larger the token bucket size of each token bucket, the lower the token rate of each token bucket. In addition, for every token bucket 121, 122 or 123, the token bucket size and the token rate are each preset as a fixed value which is time-independent. As well known, if a token arrives or generated when each token bucket 121, 122 or 123 is full, it is thrown away or discarded.

The buffer unit 100 is further configured to also include token counters 151, 152 and 153 for the respective token buckets 121, 122 and 123. Each token counter 151, 152 or 153 is configured to measure a stored-token count which represents the number of tokens being stored in the corresponding token bucket 121, 122 or 123 (i.e., the current number of accumulated tokens), in one of a positive value and a negative value.

More specifically, each token counter 151, 152 or 153 measures the stored-token count in a positive value, when the corresponding token bucket 121, 122 or 123 has stored therein at least one token (i.e., not empty), while each token counter 151, 152 or 153 measures the stored-token count in a negative value (which represents the number of the used tokens, or the balance between the number of incoming tokens and the number of outgoing tokens, with respect to the token bucket size), when the corresponding token bucket 121, 122 or 123 is empty. When the measured stored-token count has a negative value, if new tokens are added to or inserted into each token bucket 121, 122 or 123, the corresponding token counter 151, 152 or 153 increases the stored-token count toward a positive value.

There are token controllers 141, 142 and 143 for the respective token buckets 121, 122 and 123, which are configured to remove and use (or spend) equal numbers of tokens from the respective token buckets 121, 122 and 123 simultaneously. The token controllers 141, 142 and 143 are given the same "maximum possible token use count (i.e., a maximum possible token use rate, or a maximum possible number of used or spent tokens)" in common. The maximum possible token use count is defined as the maximum number of tokens that can be used from each of the token buckets 121, 122 and 123 at a time, and is preset depending on the maximum possible readout rate at which a packet reader 11 can read data packets out of a packet buffer 10. The settings for the maximum possible token use count will be elaborated below.

In the present embodiment, each token controller 141, 142 or 144 determines a desired number of tokens which are to be removed and used from each token bucket 121, 122 or 123, at each cycle time, according to one of two decisions which applies, and makes an attempt to remove and use from each token bucket 121, 122 or 123 the same number of tokens as the determined desired number of tokens.

[Decision 1]

When at least one of the three token buckets 121, 122 and 123 has stored therein a number of tokens equal to or more than the maximum possible token use count, this decision applies and each token controller 141, 142 or 143 operates to make an attempt to remove and use from each token bucket 121, 122 or 123 the same number of tokens as the maximum possible token use count.

[Decision 2]

When none of the token buckets 121, 122 and 123 has stored therein tokens equal to or more than the maximum possible token use count, this decision applies and each token controller 141, 142 or 143 operates to select one of the token buckets 121, 122 and 123 which has stored therein the largest number of tokens among them. Then, the token controllers 141, 142 and 143 make attempts to remove and use equal numbers of tokens from the respective token buckets 121, 122 and 123, wherein each of the equal numbers is the same as the number of tokens which have been stored in the selected token bucket 121, 122 or 123.

It is added that, as long as every token generator 131, 132 or 133 adds, without interruption, new tokens to the corresponding one of the token buckets 121, 122 and 123 at a predetermined token rate, it can be considered that there is no chance to have no token in any one of the token buckets 121, 122 and 123.

The packet reader 11 is configured to read out from the packet buffer 10 a number or an amount of packets which is equivalent to the product of the number of tokens that were outputted from each token bucket 121, 122 or 123 at a time, and a unit of data (i.e., a certain number of bits) which is authorized by an individual token to be read out from the packet buffer 10. The packet reader 11 reads out from the packet buffer 10 the maximum amount of packets, when every token bucket 121, 122 or 123 uses the same number of tokens as the maximum possible token use count.

It is added that the functions of the buffer unit 100 are implemented in software, that is, by executing a predetermined program by a computer mounted in the buffer unit 100 (e.g., a communication device having a buffer section).

Figure 16:
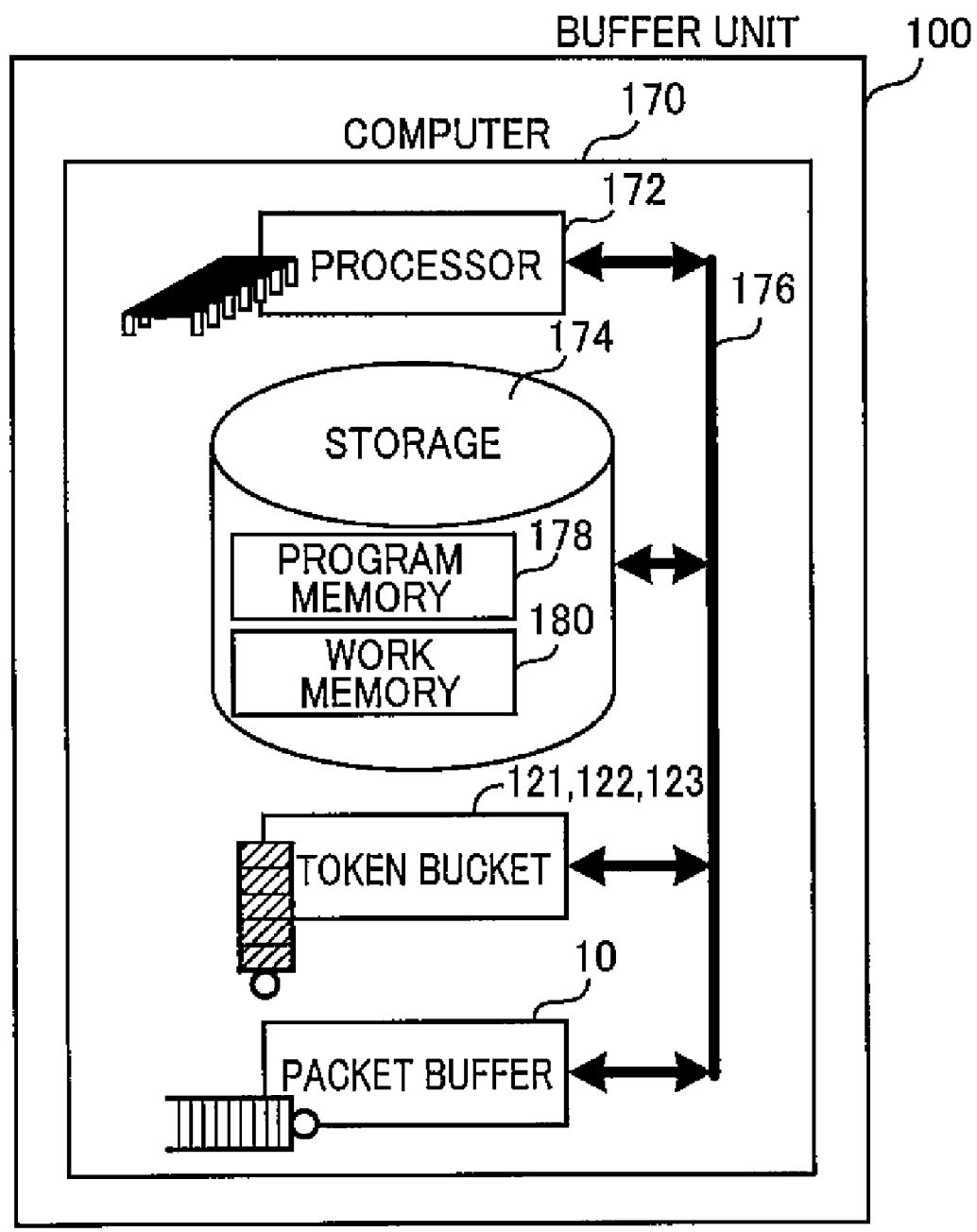
FIG. 16 is a block diagram illustrating the hardware configuration for providing the functions of the buffer unit depicted in FIG. 2.

FIG. 16 illustrates the hardware configuration of the buffer unit 100 in a schematic functional block diagram. The buffer unit 100 incorporates a computer 170 which is, as well known, configured by electrically connecting a processor 172 and a storage 174 together via a bus 176. The storage 174 has a program memory 178 in which a program has been stored for implementing the functions of the buffer unit 100, and a work memory 180. The computer 170 further has the packet buffer 10 and the token buckets 121, 122 and 123.

Figure 17:
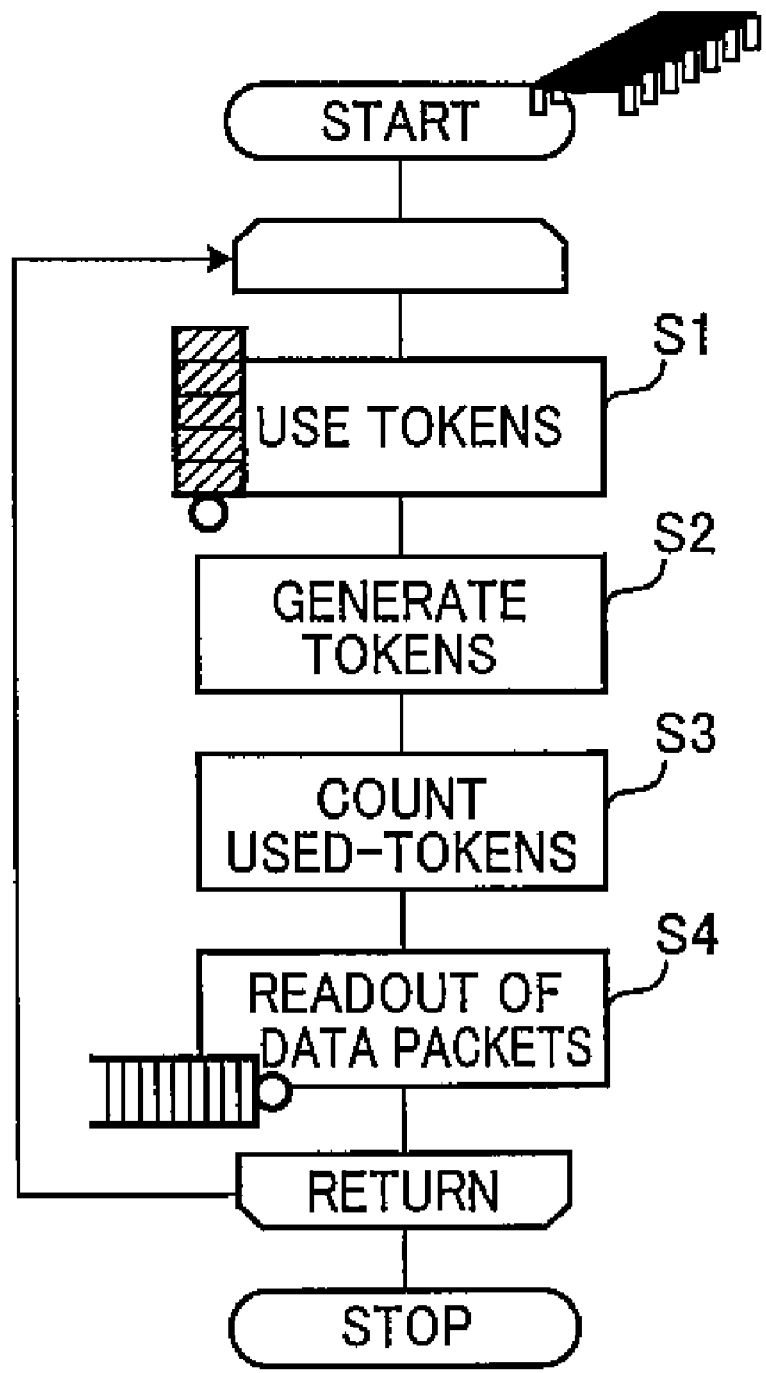
FIG. 17 is a flow chart conceptually illustrating a program which is executed by a computer depicted in FIG. 16, for thereby providing the functions of the buffer unit depicted in FIG. 2.

FIG. 17 illustrates in a flowchart conceptually the program which has been stored in the program memory 178 for implementing the functions of the buffer unit 100.

The program is repeatedly executed during operation of the buffer unit 100. Each execution cycle of this program begins with a step S1 to remove and use equal numbers of tokens from all the token buckets 121, 122 and 123.

Next, a step S2 follows to generate new tokens, for the token buckets 121, 122 and 123, at respective token rates, wherein each token rate represents the number of tokens to be generated per unit time, and the tokens rates for the respective token buckets 121, 122 and 123 are preset such that the larger the token bucket size of each token bucket 121, 122 or 123, the lower the token rate for each token bucket 121, 122 or 123. The generated sets of tokens are added to the respective token buckets 121, 122 and 123 for filling.

Next, a step S3 follows to measure a used-token count for each token bucket 121, 122 or 123 which represents the number of tokens that were removed and used from each token bucket 121, 122 or 123. A stored-token count is measured for each token bucket 121, 122 or 123 which represents the number of tokens that have been stored in each token bucket 121, 122 or 123, in a negative value, if each token bucket 121, 122 or 123 is empty.

Next, a step S4 follows to read out of the packet buffer 10 a number of data packets which is calculated from and depends on the used-token count for each token bucket 121, 122 or 123.

Then, there will be described more specifically how the three token buffers 121, 122 and 123 change in status with time during operation of the buffer unit 100.

Figure 3:
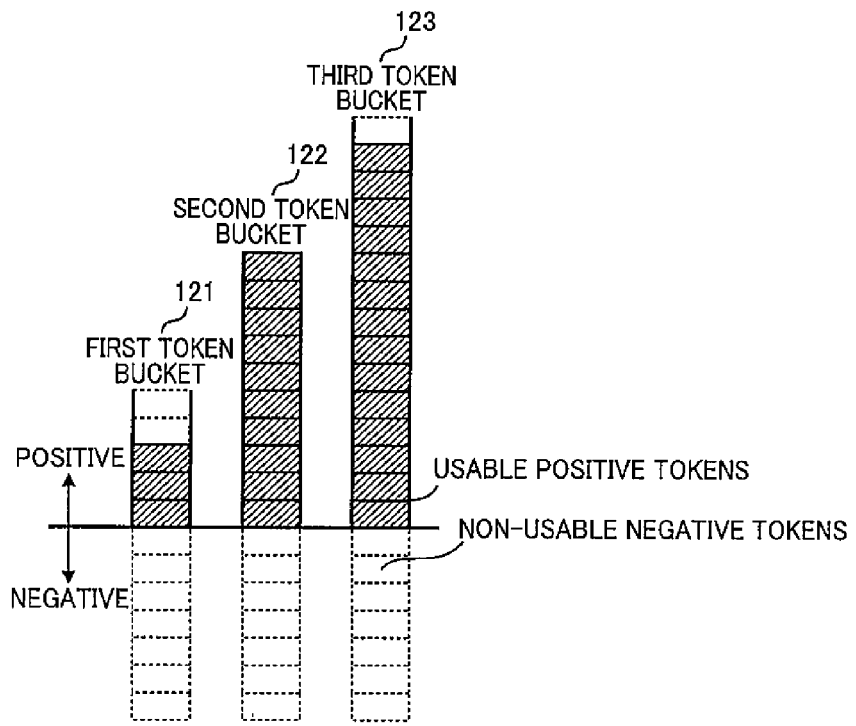
FIG. 3 illustrates three token buckets depicted in FIG. 2 in its exemplary initial status.

FIG. 3 illustrates the three token buckets 121, 122 and 123 in their exemplary initial status.

FIG. 3 depicts the first, second and third token buckets 121, 122 and 123, each with positive tokens (i.e., real, visible and usable tokens) which have been stored in each token buffer 121, 122 or 123, and negative tokens (i.e., virtual, invisible and non-usable tokens) which are countable even though each token bucket 121, 122 or 123 is empty.

Various parameters for the three token buckets 121, 122 and 123 can take the following exemplary set of values:

Token Buckets 121, 122 and 123: these buckets use tokens simultaneously, and each bucket uses one token per second, and Token: authorization of transmission of 120 k-bit data (in 120 kbps) per token.

For the first token bucket 121,

Token Bucket Size: up to 5 tokens can be stored, wherein, 120 k bits×5 tokens=600 k bits, and Token Rate: 3 tokens are added every one second for filling, wherein, 120 kbps×3 tokens=360 kbps.

For the second token bucket 122,

Token Bucket Size: up to 10 tokens can be stored, wherein, 120 k bits×10 tokens=1.2M bits, and Token Rate: 2 tokens are added every one second for filling, wherein, 120 kbps×2 tokens=240 kbps.

For the third token bucket 123,

Token Bucket Size: up to 15 tokens can be stored, wherein, 120 k bits×15 tokens=1.8M bits, and Token Rate: one token is added every one second for filling, wherein, 120 kbps×1 token=120 kbps.

If the above-mentioned exemplary set of values is applied, the maximum possible readout rate for the buffer unit 100 is, for example, as follows:

Maximum possible token use count: 6 tokens, and

Maximum possible readout rate for the buffer unit 100

=Maximum possible token use count×Authorized amount of packets of transmission per token =6 tokens×120 k bits =720 k bits.

FIG. 3 illustrates the three token buckets 121, 122 and 123 in the initial status in which the first token bucket 121 has already stored therein three tokens, the second token bucket 122 is full of ten tokens, and the three token bucket 123 has already stored therein 14 tokens.

It is added that, for the sake of description, some data packets are presupposed to be always buffered in the packet buffer 10. When, however, there is no packet in the packet buffer 10, tokens that are stored in each token bucket 121, 122 or 123 are not removed or used, not to mention. The number of tokens in each token bucket 121, 122 or 123, however, fails to exceed the corresponding token bucket size.

Figure 4:
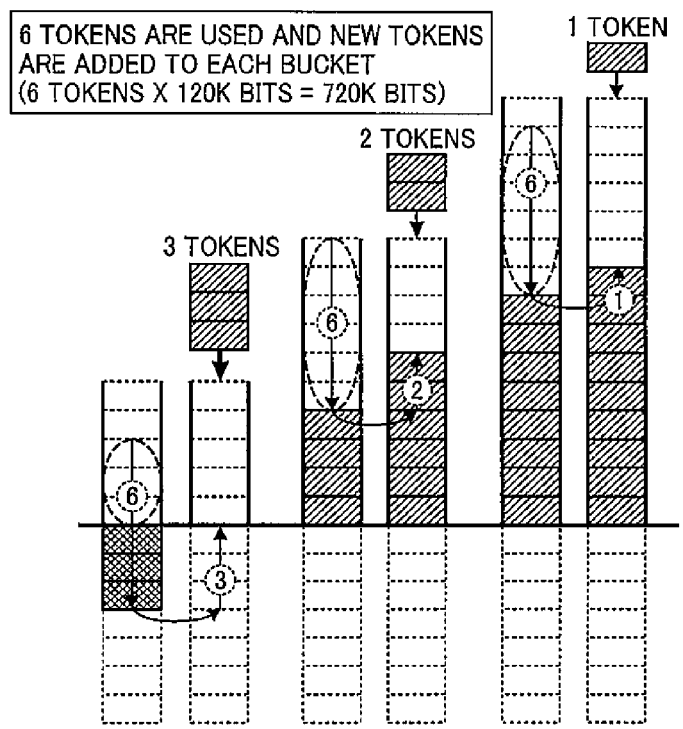
FIG. 4 illustrates the three token buckets depicted in FIG. 2 in a status shifted from the status depicted in FIG. 3.

FIG. 4 illustrates the three token buckets 121, 122 and 123 in a shifted status from the status depicted in FIG. 3.

To the status depicted in FIG. 4, the aforementioned [Decision 1] applies. Because the second and third token buckets 122 and 123 each have stored therein a number of tokens equal to or more than a maximum possible token use count of 6, 6 tokens attempt to be removed and used from each of all the token buckets 121, 122 and 123.

As a result, only 3 tokens have been actually used from the first token bucket 121, while 6 tokens are actually used from each of the second and third token buckets 122 and 123. The resulting stored-token counts are as follows:

Number of tokens in the first token bucket 121=+3−6=−3 (i.e., a negative token count), Number of tokens in the second token bucket 122=+10−6=+4, and Number of tokens in the third token bucket 123=+14−6=+8.

In this case, because the used-token count (desired value) for each token bucket 121, 122 or 123 is 6, the readout rate for the buffer unit 100 is as follows:

$$\begin{aligned}\text{Readout Rate} &= \text{used-token count} \times \\ &\quad \text{authorized data amount to be transmitted per token} \\ &= 6 \text{ tokens} \times 120\text{k bits} \\ &= 720\text{k bits}.\end{aligned}$$

Simultaneously with each action for removing tokens, the token generators 131, 132 and 133 add new tokens to the token buckets 121, 122 and 123, respectively. More specifically, 3 tokens are added to the first token bucket 121, 2 tokens are added to the second token bucket 122, and 1 token is added to the third token bucket 123. The resulting stored-token counts are as follows:

Number of tokens in the first token bucket 121=−3+3=0,

Number of tokens in the second token bucket 122=+4+2=+6, and

Number of tokens in the third token bucket 123=+8+1=+9.

Figure 5:
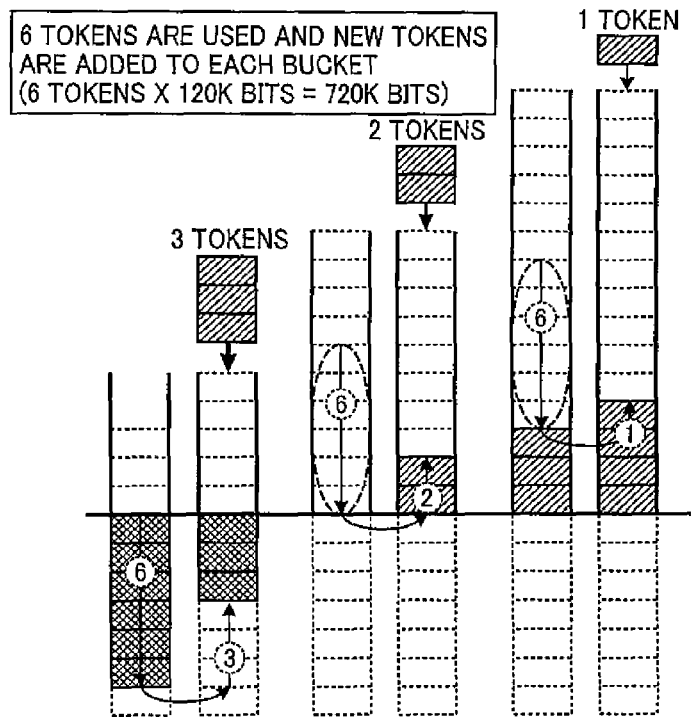
FIG. 5 illustrates the three token buckets depicted in FIG. 2 in a status shifted from the status depicted in FIG. 4.

FIG. 5 illustrates the three token buckets 121, 122 and 123 in a shifted status from the status depicted in FIG. 4.

Also to the status depicted in FIG. 5, the aforementioned [Decision 1] applies. Because the second and third token buckets 122 and 123 each have stored therein a number of tokens equal to or more than a maximum possible token use count of 6, 6 tokens attempt to be removed and used from each of all the token buckets 121, 122 and 123.

As a result, no token can be used from the first token bucket 121, while 6 tokens are actually used from each of the second and third token buckets 122 and 123. The stored-token counts are as follows:

Number of tokens in the first token bucket 121=0−6=−6,

Number of tokens in the second token bucket 122=+6−6=0, and

Number of tokens in the third token bucket 123=+9−6=+3.

In this case, because the used-token count (desired value) for each token bucket 121, 122 or 123 is 6, the readout rate for the buffer unit 100 is as follows:

$$\begin{aligned}\text{Readout Rate} &= 6 \text{ tokens} \times 120\text{k bits} \\ &= 720\text{k bits}.\end{aligned}$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=−6+3=−3,

Number of tokens in the second token bucket 122=0+2=+2, and

Number of tokens in the third token bucket 123=+3+1=+4.

Figure 6:
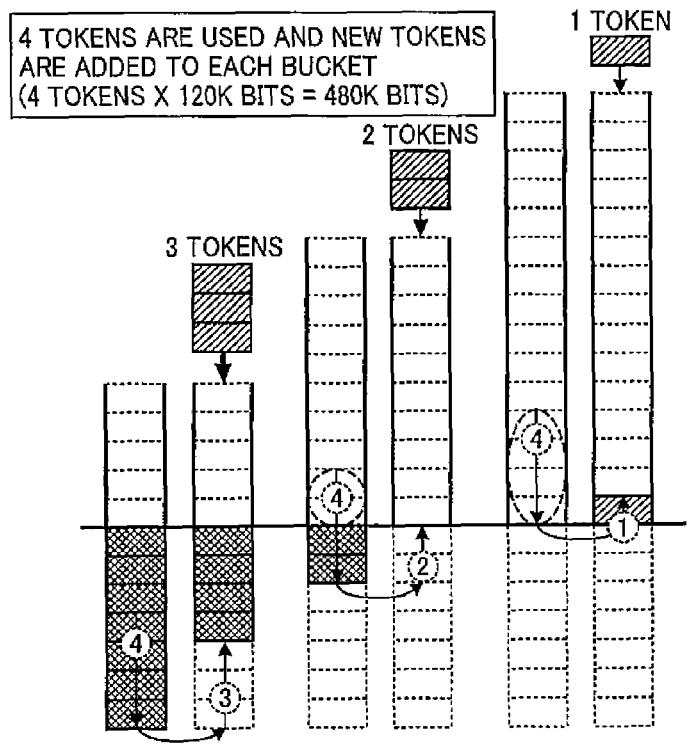
FIG. 6 illustrates the three token buckets depicted in FIG. 2 in a status shifted from the status depicted in FIG. 5.

FIG. 6 illustrates the three token buckets 121, 122 and 123 in a shifted status from the status depicted in FIG. 5.

To the status depicted in FIG. 6, the aforementioned [Decision 2] applies. None of the first, second and third token buckets 121, 122 and 123 has stored therein a number of tokens equal to or more than a maximum possible token use count of 6, and the third token bucket 123 is selected which has stored therein the largest number of tokens among the three token buckets 121, 122 and 123. A number of tokens which is equal to 4 tokens that have been stored in the selected third token bucket 123 attempt to be removed and used from each of all the token buckets 121, 122 and 123.

As a result, no token can be used from the first token bucket 121, while 2 tokens are actually used from the second token bucket 122, and 4 tokens are actually used from the third token bucket 123. The stored-token counts are as follows:

Number of tokens in the first token bucket 121=−3−4=−7,

Number of tokens in the second token bucket 122=+2−4=−2, and

Number of tokens in the third token bucket 123=+4−4=0.

In this case, because the used-token count (desired value) for each token bucket 121, 122 or 123 is 4, the readout rate for the buffer unit 100 is as follows:

$$\begin{aligned}\text{Readout Rate} &= 4 \text{ tokens} \times 120\text{k bits} \\ &= 480\text{k bits}.\end{aligned}$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=−7+3=−4,

Number of tokens in the second token bucket 122=−2+2=0, and

Number of tokens in the third token bucket 123=0+1=+1.

Figure 7:
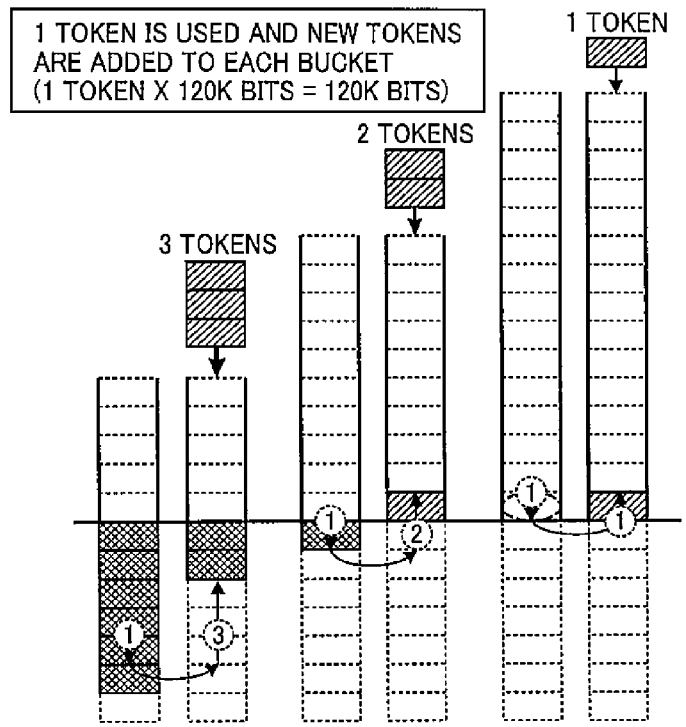
FIG. 7 illustrates the three token buckets depicted in FIG. 2 in a status shifted from the status depicted in FIG. 6.

FIG. 7 illustrates the three token buckets 121, 122 and 123 in a shifted status from the status depicted in FIG. 6.

Also to the status depicted in FIG. 7, the aforementioned [Decision 2] applies. None of the first, second and third token buckets 121, 122 and 123 has stored therein a number of tokens equal to or more than a maximum possible token use count of 6, and the third token bucket 123 is selected which has stored therein the largest number of tokens among the three token buckets 121, 122 and 123. One token which is the same in number as that has been stored in the selected third token bucket 123 attempts to be removed and used from each of all the token buckets 121, 122 and 123.

As a result, no token can be used from the first or second token bucket 121 or 122, while 1 token is actually used from the third token bucket 123. The stored-token counts are as follows:

Number of tokens in the first token bucket 121=−4−1=−5,

Number of tokens in the second token bucket 122=0−1=−1, and

Number of tokens in the third token bucket 123=+1−1=0.

In this case, because the used-token count (desired value) for each token bucket 121, 122 or 123 is 1, the readout rate for the buffer unit 100 is as follows:

$$\text{Readout Rate} = 1 \text{ token} \times 120\text{k bits}$$
$$= 120\text{k bits}.$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=−5+3=−2,
Number of tokens in the second token bucket 122=−1+2=+1, and
Number of tokens in the third token bucket 123=0+1=+1.

Figure 8:
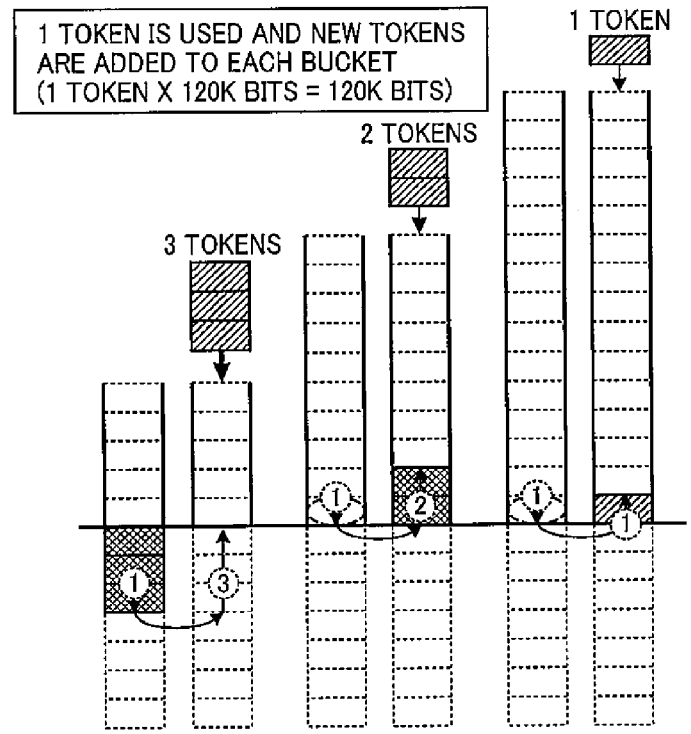
FIG. 8 illustrates the three token buckets depicted in FIG. 2 in a status shifted from the status depicted in FIG. 7.

FIG. 8 illustrates the three token buckets 121, 122 and 123 in a shifted status from the status depicted in FIG. 7.

Also to the status depicted in FIG. 8, the aforementioned [Decision 2] applies. None of the first, second and third token buckets 121, 122 and 123 has stored therein a number of tokens equal to or more than a maximum possible token use count of 6, and the second or third token bucket 122 or 123 is selected which has stored therein the largest number of tokens among the three token buckets 121, 122 and 123. One token which is the same in number as that has been stored in the selected second or third token bucket 122 or 123 attempts to be removed and used from each of all the token buckets 121, 122 and 123.

As a result, no token can be used from the first token bucket 121, while 1 token is actually used from each of the second and third token buckets 122 and 123. The stored-token counts are as follows:

Number of tokens in the first token bucket 121=−2−1=−3,
Number of tokens in the second token bucket 122=+1−1=0, and
Number of tokens in the third token bucket 123=+1−1=0.

In this case, because the used-token count (desired value) for each token bucket 121, 122 or 123 is 1, the readout rate for the buffer unit 100 is as follows:

$$\text{Readout Rate} = 1 \text{ token} \times 120\text{k bits}$$
$$= 120\text{k bits}.$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=−3+3=0,
Number of tokens in the second token bucket 122=0+2=+2, and
Number of tokens in the third token bucket 123=0+1=+1.

Figure 9:
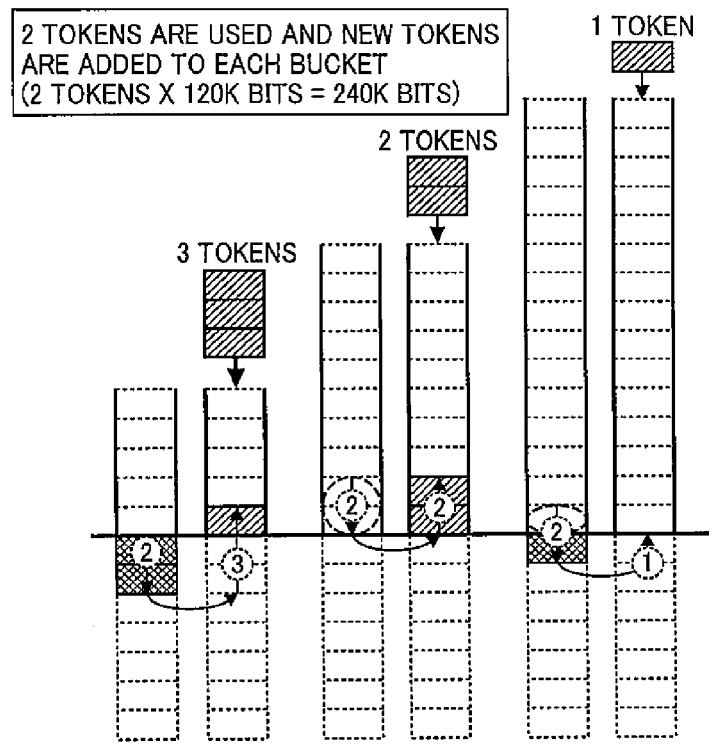
FIG. 9 illustrates the three token buckets depicted in FIG. 2 in a status shifted from the status depicted in FIG. 8.

FIG. 9 illustrates the three token buckets 121, 122 and 123 in a shifted status from the status depicted in FIG. 8.

Also to this status, the aforementioned [Decision 2] applies. None of the first, second and third token buckets 121, 122 and 123 has stored therein a number of tokens equal to or more than a maximum possible token use count of 6, and the second token bucket 122 is selected which has stored therein the largest number of tokens among the three token buckets 121, 122 and 123. A number of tokens which is equal to 2 tokens that have been stored in the selected second token bucket 122 attempt to be removed and used from each of all the token buckets 121, 122 and 123.

As a result, no token can be used from the first token bucket 121, while 2 tokens are actually used from the second bucket 122, and 1 token is actually used from the third token bucket 123. The stored-token counts are as follows:

Number of tokens in the first token bucket 121=0−2=−2,
Number of tokens in the second token bucket 122=+2−2=0, and
Number of tokens in the third token bucket 123=+1−2=−1.

In this case, because the used-token count (desired value) for each token bucket 121, 122 or 123 is 2, the readout rate for the buffer unit 100 is as follows:

$$\text{Readout Rate} = 2 \text{ tokens} \times 120\text{k bits}$$
$$= 240\text{k bits}.$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=−2+3=+1,
Number of tokens in the second token bucket 122=0+2=+2, and
Number of tokens in the third token bucket 123=−1+1=0.

Figure 10:
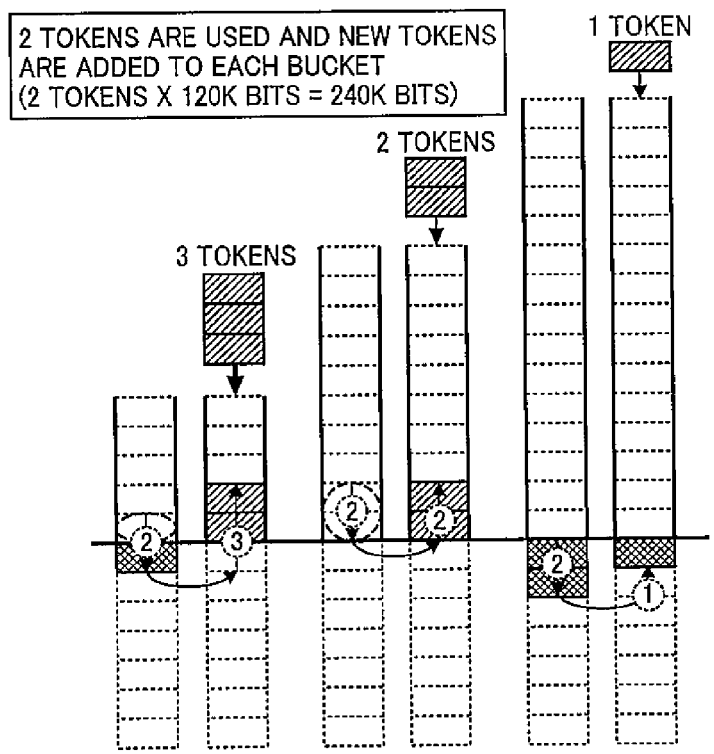
FIG. 10 illustrates the three token buckets depicted in FIG. 2 in a status shifted from the status depicted in FIG. 9.

FIG. 10 illustrates the three token buckets 121, 122 and 123 in a shifted status from the status depicted in FIG. 9.

Also to this status, the aforementioned [Decision 2] applies. None of the first, second and third token buckets 121, 122 and 123 has stored therein a number of tokens equal to or more than a maximum possible token use count of 6, and the second token bucket 122 is selected which has stored therein the largest number of tokens among the three token buckets 121, 122 and 123. A number of tokens which is equal to two tokens that have been stored in the selected second token bucket 122 attempt to be removed and used from each of all the token buckets 121, 122 and 123.

As a result, one token is used from the first token bucket 121, and two tokens are used from the second token bucket 122, while no token can be used from the third token bucket 123. The stored-token counts are as follows:

Number of tokens in the first token bucket 121=+1−2=−1,
Number of tokens in the second token bucket 122=+2−2=0, and
Number of tokens in the third token bucket 123=0−2=−2.

In this case, because the used-token count (desired value) for each token bucket 121, 122 or 123 is 2, the readout rate for the buffer unit 100 is as follows:

$$\text{Readout Rate} = 2 \text{ tokens} \times 120\text{k bits}$$
$$= 240\text{k bits}.$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=−1+3=+2,
Number of tokens in the second token bucket 122=0+2=+2, and
Number of tokens in the third token bucket 123=−2+1=−1.

Figure 11:
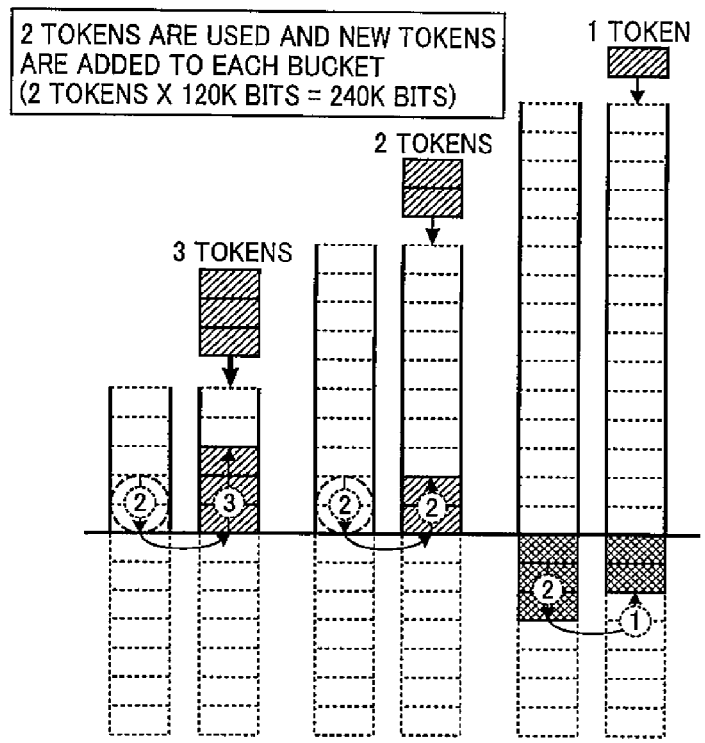
FIG. 11 illustrates the three token buckets depicted in FIG. 2 in a status shifted from the status depicted in FIG. 10.

FIG. 11 illustrates the three token buckets 121, 122 and 123 in a shifted status from the status depicted in FIG. 10.

Also to this status, the aforementioned [Decision 2] applies. None of the first, second and third token buckets 121, 122 and 123 has stored therein a number of tokens equal to or more than a maximum possible token use count of 6, and the first or second token bucket 121 or 122 is selected which has stored therein the largest number of tokens among the three token buckets 121, 122 and 123. A number of tokens which is equal to two tokens that have been stored in the selected first or second token bucket 121 or 122 attempt to be removed and used from each of all the token buckets 121, 122 and 123.

As a result, two tokens are used from each of the first and second token buckets 121 and 122, while no token can be used from the third token bucket 123. The stored-token counts are as follows:

Number of tokens in the first token bucket 121=+2−2=0,
Number of tokens in the second token bucket 122=+2−2=0, and
Number of tokens in the third token bucket 123=−1−2=−3.

In this case, because the used-token count (desired value) for each token bucket 121, 122 or 123 is 2, the readout rate for the buffer unit 100 is as follows:

$$\text{Readout Rate} = 2 \text{ tokens} \times 120\text{k bits}$$
$$= 240\text{k bits}.$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=0+3=+3,
Number of tokens in the second token bucket 122=0+2=+2, and
Number of tokens in the third token bucket 123=−3+1=+2.

Figure 12:
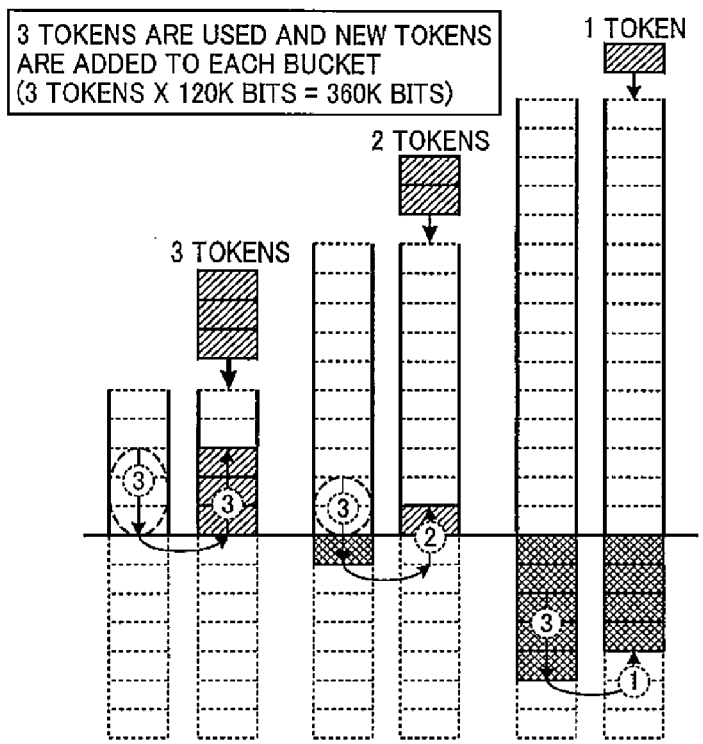
FIG. 12 illustrates the three token buckets depicted in FIG. 2 in a status shifted from the status depicted in FIG. 11.

FIG. 12 illustrates the three token buckets 121, 122 and 123 in a shifted status from the status depicted in FIG. 11.

Also to this status, the aforementioned [Decision 2] applies. None of the first, second and third token buckets 121, 122 and 123 has stored therein a number of tokens equal to or more than a maximum possible token use count of 6, and the first token bucket 121 is selected which has stored therein the largest number of tokens among the three token buckets 121, 122 and 123. A number of tokens which is equal to three tokens that have been stored in the selected first token bucket 122 attempt to be removed and used from each of all the token buckets 121, 122 and 123.

As a result, 3 tokens are used from the first token bucket 121, and two tokens are used from the second token bucket 122, while no token can be used from the third token bucket 123. The stored-token counts are as follows:

Number of tokens in the first token bucket 121=+3−3=0,
Number of tokens in the second token bucket 122=+2−3=−1, and
Number of tokens in the third token bucket 123=−2−3=−5.

In this case, because the used-token count (desired value) for each token bucket 121, 122 or 123 is 3, the readout rate for the buffer unit 100 is as follows:

$$\text{Readout Rate} = 3 \text{ tokens} \times 120\text{k bits}$$
$$= 360\text{k bits}.$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=0+3=+3,
Number of tokens in the second token bucket 122=−1+2=+1, and
Number of tokens in the third token bucket 123=−5+1=−4.

Figure 13:
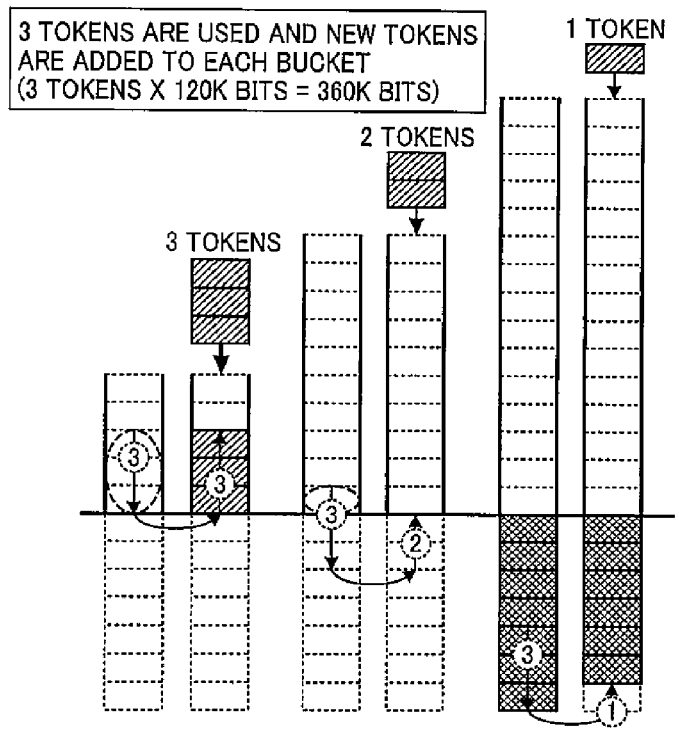
FIG. 13 illustrates the three token buckets depicted in FIG. 2 in a status shifted from the status depicted in FIG. 12.

FIG. 13 illustrates the three token buckets 121, 122 and 123 in a shifted status from the status depicted in FIG. 12.

Also to this status, the aforementioned [Decision 2] applies. None of the first, second and third token buckets 121, 122 and 123 has stored therein a number of tokens equal to or more than a maximum possible token use count of 6, and the first token bucket 121 is selected which has stored therein the largest number of tokens among the three token buckets 121, 122 and 123. A number of tokens which is equal to three tokens that have been stored in the selected first token bucket 122 attempt to be removed and used from each of all the token buckets 121, 122 and 123.

As a result, 3 tokens are used from the first token bucket 121, and one token is used from the second token bucket 122, while no token can be used from the third token bucket 123. The stored-token counts are as follows:

Number of tokens in the first token bucket 121=+3−3=0,
Number of tokens in the second token bucket 122=+1−3=−2, and
Number of tokens in the third token bucket 123=−4−3=−7.

In this case, because the used-token count (desired value) for each token bucket 121, 122 or 123 is 3, the readout rate for the buffer unit 100 is as follows:

$$\text{Readout Rate} = 3 \text{ tokens} \times 120\text{k bits}$$
$$= 360\text{k bits}.$$

Simultaneously with each action for removing tokens, the token generators 131, 132 and 133 add new tokens to the token buckets 121, 122 and 123, respectively. The resulting stored-token counts are as follows:

Number of tokens in the first token bucket 121=0+3=+3,
Number of tokens in the second token bucket 122=−2+2=0, and
Number of tokens in the third token bucket 123=−7+1=−6.

Figure 14:
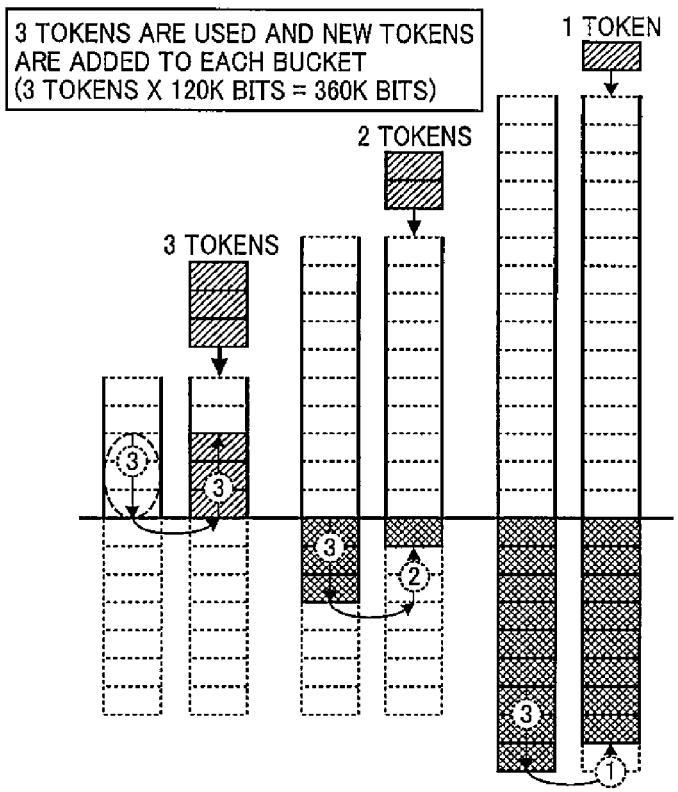
FIG. 14 illustrates the three token buckets depicted in FIG. 2 in a status shifted from the status depicted in FIG. 13.

FIG. 14 illustrates the three token buckets 121, 122 and 123 in a shifted status from the status depicted in FIG. 13.

Also to this status, the aforementioned [Decision 2] applies. None of the first, second and third token buckets 121, 122 and 123 has stored therein a number of tokens equal to or more than a maximum possible token use count of 6, and the first token bucket 121 is selected which has stored therein the largest number of tokens among the three token buckets 121, 122 and 123. A number of tokens which is equal to three tokens that have been stored in the selected first token bucket 122 attempt to be removed and used from each of all the token buckets 121, 122 and 123.

As a result, 3 tokens are used from the first token bucket 121, while no token can be used from the second or third token bucket 122 or 123. The stored-token counts are as follows:

Number of tokens in the first token bucket 121=+3−3=0,
Number of tokens in the second token bucket 122=0−3=−3, and
Number of tokens in the third token bucket 123=−6−3=−9.

In this case, because the used-token count (desired value) for each token bucket 121, 122 or 123 is 3, the readout rate for the buffer unit 100 is as follows:

Readout Rate = 3 tokens × 120k bits

= 360k bits.

Simultaneously with each action for tokens to be removed, the token generators 131, 132 and 133 add new tokens to the token buckets 121, 122 and 123, respectively. The resulting stored-token counts are as follows:

Number of tokens in the first token bucket 121=0+3=+3,

Number of tokens in the second token bucket 122=−3+2=−1, and

Number of tokens in the third token bucket 123=−9+1=−8.

Figure 15:
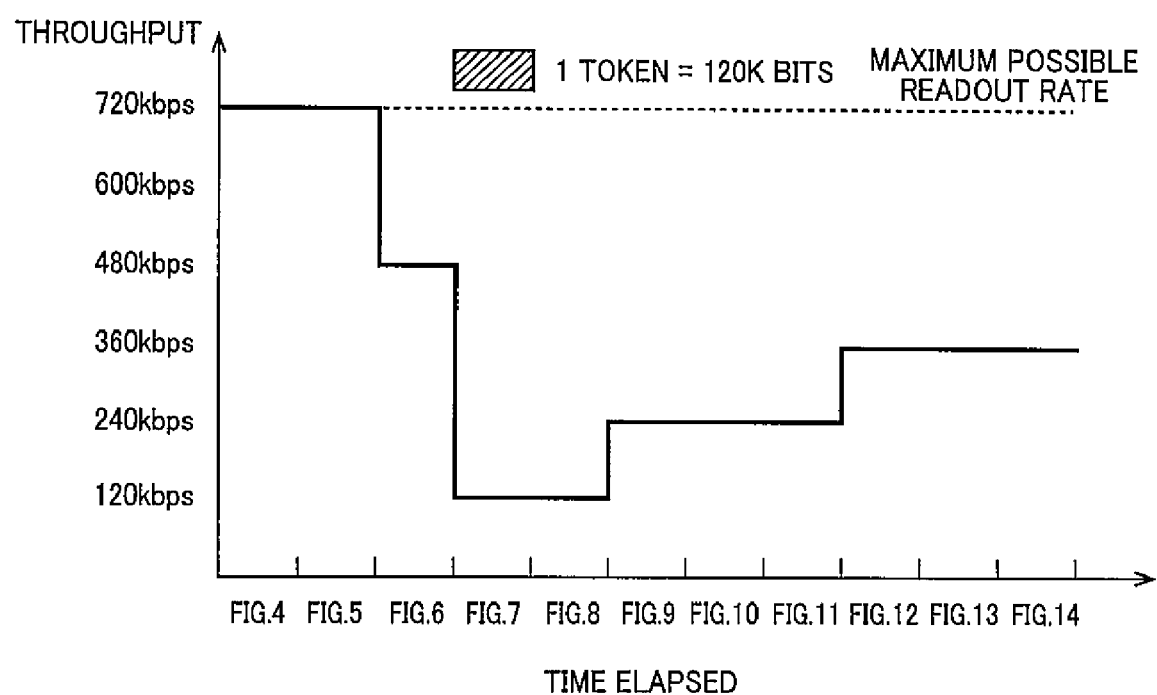
FIG. 15 is a graph indicating an exemplary time-series of values of the throughput of the buffer unit depicted in FIG. 2.

During operation of the buffer unit 100, if the status of each token bucket 121, 122 or 123 changes with time as illustrated in FIGS. 3-14, the readout rate for the buffer unit 100, that is, the throughput varies with time as illustrated in FIG. 15 in graph.

In addition, the throughput of a network is featured by peak performance and an average throughput. The peak performance is more important (e.g., should be more enhanced) in a first situation, for example, for viewing web sites (e.g., home pages), while the average throughput is more important (e.g., should be more enhanced) in a second situation, for example, for downloading files. One of the objects of the present embodiment is to flexibly accommodate both of the first and second situations.

In the present embodiment, the used-token count (the number of tokens to be used each cycle time) common to the three token buckets 121, 122 and 123 varies with time within a range not exceeding the maximum possible token use count. Temporal variation in the used-token count invites temporal variation in the readout rate for the buffer unit 100. More specifically, the smaller the used-token count, the lower the readout rate.

For a token bucket having a larger bucket size, it can accumulate more tokens, but once it has become empty, more time will be taken before the number of tokens in this larger token bucket reaches the maximum number of tokens that can be accumulated in another token bucket having a smaller bucket size, because this larger token bucket has its token rate lower than the smaller token bucket. On the other hand, for the smaller token bucket, it can accumulate only fewer tokens, but even if it has become empty, only less time will be taken before this smaller token bucket becomes full of tokens, because this smaller token bucket has its token rate higher than the larger token bucket.

During a period within which the larger token bucket keeps storing therein more tokens than those in the smaller token bucket, the readout rate is determined to be a higher rate varying depending on the used-token count of the larger token bucket (i.e., the number of tokens that were used from the larger token bucket, or the current number of spent or used tokens). In contrast, during a period within which the larger token bucket is empty, or the larger token bucket keeps storing therein only fewer tokens than those in the smaller token bucket, the readout rate is determined to be a lower rate varying depending on the used-token count of the smaller token bucket (i.e., the number of tokens that were used from the smaller token bucket).

On the other hand, once the packet buffer 10 has become empty, no token can be used from the first, second or third token bucket 121, 122 or 123. For this reason, if the packet buffer 10 keeps empty, all of the token buckets 121, 122 and 123 will become full of tokens. It is added that the number of data packets contained in the packet buffer 10 depends on the traffic volume in a communication network. The larger the traffic volume, the larger the possibility that the packet buffer 10 becomes empty.

In contrast, if data packets have been just stored in the packet buffer 10, then tokens will be used from all the token buckets 121, 122 and 123, with the data packets read out from the packet buffer 10 at the maximum possible readout rate, as long as a larger token bucket has stored therein more packets than a smaller token bucket.

If, in the course of time, the number of tokens in the larger token bucket has become smaller than the number of tokens in the smaller token bucket, then the data packets will be read out from the packet buffer 10 at a readout rate lower than the maximum possible readout rate.

As will be evident from the foregoing, in the present embodiment, because of the concurrent employment of the token buckets 121, 122 and 123 having different token bucket sizes and token rates, the readout rate of packets from the packet buffer 10 is controlled so flexibly as to adapt to changes in the traffic characteristic, without a need for prior precise setting of bucket parameters such as a token bucket size and a token rate, to such optimal values that adapt to the actual or specific traffic characteristic. In other words, in the present embodiment, only prior coarse or rough setting of the token bucket sizes and the token rates, to time-independent values, just based on precedent or in an empirical approach, makes an automated selection of the readout rate of packets so as to adapt to the traffic characteristic, owing to the adaptive control of the readout rate.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A buffer unit having a packet buffer for temporary storage of data packets, comprising:

a plurality of token buckets, each of which allows for temporary storage of tokens, each of the tokens authorizing transmission of a unit of data, wherein the token buckets have different token bucket sizes, respectively, and each token bucket size represents a maximum number of tokens that can be stored in a corresponding one of the token buckets;

a plurality of token controllers associated with the respective token buckets, and configured to remove and use equal numbers of tokens from the respective token buckets;

a plurality of token generators associated with the respective token buckets, wherein each token generator is configured to generate tokens at a token rate at which tokens are to be generated per unit time for a corresponding one of the token buckets, wherein each token rate is preset such that the larger the token bucket size of the corresponding token bucket, the lower the token rate for the corresponding token bucket, and wherein each token generator is further configured to add the generated tokens to the corresponding token bucket;

a plurality of token counters associated with the respective token buckets, wherein each token counter is configured to measure a used-token count which represents a number of tokens that were used from a corresponding one of the token buckets, and measure a stored-token count which represents a number of tokens stored in the corresponding token bucket, such that the stored-token count has a positive value representing a number of the tokens in the corresponding token bucket when the corresponding token bucket is not empty, and the stored-token count has a negative value having an absolute value representing a balance between a number of incoming tokens and a number of outgoing tokens, with respect to the token bucket size, when the corresponding token bucket is empty; and a packet reader configured to read out of the packet buffer a number of data packets which depends on the measured value of the used-token count for each token buffer.

2. The buffer unit according to claim 1, wherein the plurality of token controllers are configured to use tokens from the respective token buckets every unit time; and the plurality of token generators are configured to add tokens to the respective token buckets at the respective token rates, each time the respective token controllers use tokens.

3. The buffer unit according to claim 1, wherein each token counter is configured to operate, when the measured stored-token count for the corresponding token bucket has a negative value, to increase the stored-token count toward a positive value, each time tokens are added to the corresponding token bucket.

4. The buffer unit according to claim 1, wherein the token buckets share a same maximum possible token use count which represents a maximum number of tokens which can be used from each token bucket at a time, and wherein the maximum possible token use count is preset depending on a maximum possible readout rate at which the packet reader can read the data packets from the packet buffer.

5. The buffer unit according to claim 4, wherein the plurality of token controllers are configured to operate, when at least one of the token buckets has stored therein a number of tokens equal to or more than the maximum possible token use count, to use tokens from the respective token buckets, a same number of tokens as the maximum possible token use count, and operate, when none of the token buckets has stored therein tokens equal to or more than the maximum possible token use count, to select one of the token buckets which has stored therein a largest number of tokens among the token buckets, and to use equal numbers of tokens from the respective token buckets, wherein each of the equal numbers is set to be a same as a number of tokens which have been stored in the selected token bucket.

6. A communication device for transmitting data packets, which includes the buffer unit constructed according to claim 1.

7. A method of controlling a buffer unit having a packet buffer for temporary storage of data packets, the buffer unit being configured to include a plurality of token buckets, each of which allows for temporary storage of tokens, each of the tokens authorizing transmission of a unit of data, wherein the token buckets have different token bucket sizes, respectively, and each token bucket size represents a maximum number of tokens that can be stored in a corresponding one of the token buckets, the method comprising:

removing and using equal numbers of tokens from the token buckets, respectively;

generating tokens at a token rate at which tokens are to be generated per unit time for each token bucket, wherein each token rate is preset such that the larger the token bucket size of each token bucket, the lower the token rate for each token bucket, and adding the generated tokens to the token buckets, respectively;

measuring a used-token count which represents a number of tokens that were used from each token bucket, and measuring a stored-token count which represents a number of tokens stored in each token bucket, such that the stored-token count has a positive value representing a number of the tokens in the corresponding token bucket when the corresponding token bucket is not empty, and the stored-token count has a negative value having an absolute value representing a balance between a number of incoming tokens and a number of outgoing tokens, with respect to the token bucket size, when each token bucket is empty; and reading out of the packet buffer a number of data packets which depends on the measured value of the used-token count for each token buffer.

8. A computer-readable non-transitory storage medium having stored therein a program which, when executed by a computer, effects the method according to claim 7.

9. A method of controlling a buffer unit having a packet buffer for temporary storage of data packets, the buffer unit being configured to include a plurality of token buckets, each of which allows for temporary storage of tokens, each of the tokens authorizing transmission of a unit of data, wherein the token buckets have different token bucket sizes, respectively, and each token bucket size represents a maximum number of tokens that can be stored in a corresponding one of the token buckets, the method comprising:

removing and using equal numbers of tokens from the token buckets, respectively;

generating tokens at a token rate at which tokens are to be generated per unit time for each token bucket, wherein each token rate is preset such that the larger the token bucket size of each token bucket, the lower the token rate for each token bucket, and adding the generated tokens to the token buckets, respectively;

measuring a used-token count which represents a number of tokens that were used from each token bucket; and reading out of the packet buffer a number of data packets which depends on the measured value of the used-token count for each token buffer.

* * * * *